Feb. 23, 1943.   P. MARTIN   2,312,043
POWER CLEAVER
Filed April 11, 1942
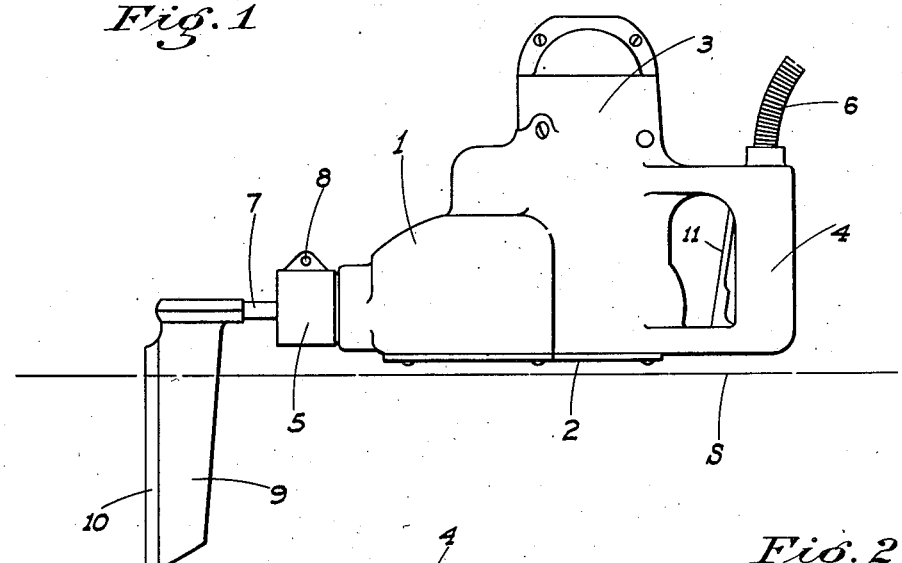
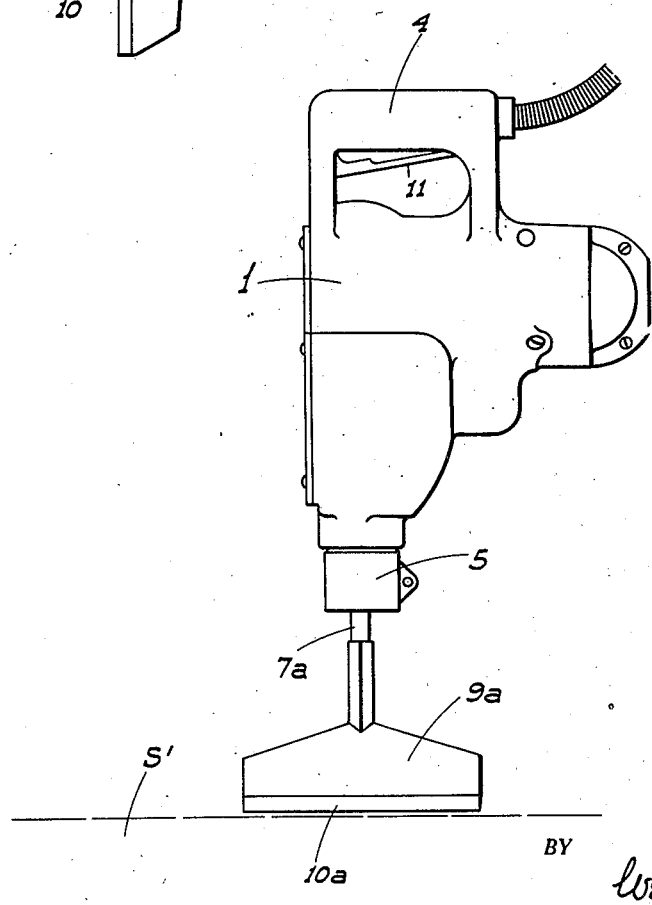
INVENTOR.
Philip Martin
BY
ATTORNEYS Patented Feb. 23, 1943

2,312,043

UNITED STATES PATENT OFFICE 2,312,043

POWER CLEAVER

Philip Martin, Los Angeles, Calif.

Application April 11, 1942, Serial No. 438,539

1 Claim. (Cl. 30—272)

This invention relates generally to an improved cutting or cleaving device designed especially for use by wholesale butchers or slaughterhouse workmen to split or separate dressed animal carcasses into sections, or what may be termed wholesale cuts.

At present, it is the practice—for example in halving a carcass—to cut or split the same lengthwise mainly by use of a large hand cleaver, which requires considerable time, effort and skill on the part of the operator to accomplish proper and desired results.

It is therefore the principal object of this invention to provide a power-actuated cleaver or meat splitter; such apparatus being operative to cut or split meat easily, cleanly and rapidly, without requiring any especial skill on the part of the operator.

A further object of this invention is to provide a device as above in which the cleaver or blade portion is power actuated by means of an electric trip-hammer, which imparts to the blade a relatively short but relatively fast reciprocating action, which in turn causes the blade as pressed against the meat to cut therethrough with a clean shearing action.

It is also an object of the invention to provide a power cleaver in which the power or drive mechanism is enclosed in a body, said body being relatively flat on one side and adapted to rest with said side against the carcass to be split, whereby the device is supported and guiding thereof facilitated; there being a handle on one end of the body, and a blade-holding chuck on the other end of the body, the blade extending laterally relative to said chuck in the direction in which said flat side of the body faces, so that the blade penetrates the meat when the body is in such position.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views:

Figure 1 is a side elevation of the device, including one type of splitting blade.

Figure 2 is a side elevation of the device, including a different type of blade.

Referring now more particularly to the characters of reference on the drawing, the device compises a body 1 having a flat side 2 and a motor housing 3 projecting from the opposite side of the body. At one end, the body is fitted with a pistol-grip type handle 4, while at the other end it is fitted with a chuck 5. This chuck is mounted for reciprocating movement through a short stroke in a path parallel to the flat side 2 and adjacent the plane thereof. The mounting and actuating mechanism for chuck 5 is disposed wholly within the housing 1 and is not shown, and may be of any conventional form, including an electric motor enclosed within housing 3. The electric motor is supplied with current from a supply cord 6 which leads into housing 1 through handle 4.

The blade shown in Fig. 1 includes a shank or stem 7 extending axially into chuck 5 and is secured therein in removable relation by means of a release element 8 on the chuck.

The blade 9 is of substantial length, and extends at right angles and radially from shank 7 in the same direction that the flat side 2 of housing 1 faces. Further, as blade 9 is of substantial length, it will penetrate into the meat a considerable distance when side 2 seats on or is adjacent the surface S thereof. The blade 9 is relatively narrow, which permits the operator to shift the body 1 and change the direction of cut without removing the blade from the meat and without binding or cramping the blade, which would tend to produce a poor cut.

When this type of blade is used, the operator grasps handle 4 and with side 2 of body 1 seating on surface S of the carcass or meat, pushes the device ahead at a relatively slow speed. At the same time, chuck 5 is being reciprocated at relatively fast speed—about 160 strokes per minute—which results in the leading and sharpening edge 10 of the blade cutting or cleaving sharply and cleanly through the meat and bone of the carcass.

By using this type of power actuated cleaver, the meat as cut or split is left quite clean, and without any surface deposit, as is the case when an electric saw is used, and which results in small particles of bone from the teeth of the saw being spread across the meat, and which soon becomes grayish in color and may cause deterioration.

In the embodiment shown in Fig. 2, the device—with the exception of the blade and shank—is of the same construction, including body 1, handle 4 and chuck 5. However, in this embodiment the blade 9a is fitted with a shank 7a centrally between the ends of the blade and projecting rearwardly therefrom into the chuck 5. This blade 9a is of substantial width, and its forward edge 10a is sharpened.

This modified type of blade will be used when it is not feasible to rest the device on the carcass and to advance the same as previously described, and will be manipulated in the manner shown in Fig. 2, wherein the body 1 is held substantially vertically above the surface S' with the blade 9a resting on said surface. With actuation of the device, the blade drives directly through the meat, making a full, clean cut, whereupon the blade will be retracted, moved along, and the operation repeated.

With the power actuated meat cleaver or splitter as herein described, meat cutting operations can be speeded up and can be accomplished with a minimum of effort; the device being relatively light in weight and handy to use.

The usual motor-control trigger 11 is mounted in connection with the handle 4, so that the hand gripping said handle also controls the operation of the cleaver.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

In a power cleaver which includes a body enclosing a power actuated reciprocating mechanism; said body being flat on one side, said flat side being adapted to rest on the meat to be cut, a handle on one end of the body, a shank projecting from the other end of the body parallel to said flat side thereof, means connecting said shank with said reciprocating mechanism, and a relatively long flat blade fixed at one end on the shank and projecting radially therefrom in the same direction that said flat side of the body faces; said blade being relatively narrow, terminating at its outer end a substantial distance outwardly of said flat side, and being sharpened on the longitudinal edge remote from said body.

PHILIP MARTIN.